United States Patent
Srivastava et al.

(10) Patent No.: US 11,488,270 B2
(45) Date of Patent: Nov. 1, 2022

(54) SYSTEM AND METHOD FOR CONTEXT AND SEQUENCE AWARE RECOMMENDATION

(71) Applicant: Tata Consultancy Services Limited, Mumbai (IN)

(72) Inventors: Rajiv Radheyshyam Srivastava, Pune (IN); Girish Keshav Palshikar, Pune (IN); Swapnil Vishveshwar Hingmire, Pune (IN); Saheb Chourasia, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1364 days.

(21) Appl. No.: 15/834,529

(22) Filed: Dec. 7, 2017

(65) Prior Publication Data
US 2018/0158164 A1 Jun. 7, 2018

(30) Foreign Application Priority Data
Dec. 7, 2016 (IN) .............................. 201621041802

(51) Int. Cl.
*G06Q 50/20* (2012.01)
*G06N 5/02* (2006.01)

(52) U.S. Cl.
CPC ........... *G06Q 50/2057* (2013.01); *G06N 5/02* (2013.01)

(58) Field of Classification Search
CPC .............................. G06Q 50/2057; G06N 5/02
See application file for complete search history.

(56) References Cited

U.S. PATENT DOCUMENTS

| | | | |
|---|---|---|---|
| 8,762,374 B1 | 6/2014 | Chen et al. | |
| 9,753,945 B2 | 9/2017 | Jurca | |
| 2011/0208730 A1 | 8/2011 | Jiang et al. | |
| 2013/0325779 A1* | 12/2013 | Shahshahani | G06N 5/00 706/46 |
| 2015/0262069 A1* | 9/2015 | Gabriel | G06F 16/9535 706/48 |
| 2016/0147845 A1 | 5/2016 | Gilbert et al. | |
| 2018/0012170 A1* | 1/2018 | Roberts | G06F 16/24578 |

OTHER PUBLICATIONS

Ling, Guang, Michael R. Lyu, and Irwin King. "Ratings meet reviews, a combined approach to recommend." Proceedings of the 8th ACM Conference on Recommender systems. 2014. (Year: 2014).*

* cited by examiner

*Primary Examiner* — Kevin W Figueroa
(74) *Attorney, Agent, or Firm* — Finnegan, Henderson, Farabow, Garrett & Dunner LLP

(57) ABSTRACT

The present disclosure provides a system and method for recommending context and sequence aware based training set to a user. The system identifies various items and keywords of a plurality of earlier trainings of the users' interest and generates a context and sequence aware recommendation model based on the context of the identified keywords. It uses a collapsed Gibbs Sampling as in generative modelling for prior trainings. Further, it applies the context and sequence aware recommendation model on various keywords that are of users' interest. The context and sequence aware recommendation model infers a plurality of subsequent trainings based on context derived from the keywords. In addition to this, the model is generated to rank the inferred plurality of subsequent topics using a probability distribution over subsequent keywords. At the last, it recommends at least one topic to the user based on ranking of the plurality of trainings.

9 Claims, 8 Drawing Sheets

SYSTEM AND METHOD FOR CONTEXT AND SEQUENCE AWARE RECOMMENDATION

PRIORITY CLAIM

This U.S. patent application claims priority under 35 U.S.C. § 119 to India Application No. 201621041802, filed on Dec. 7, 2016. The entire contents of the abovementioned application are incorporated herein by reference.

TECHNICAL FIELD

The present disclosure in general relates to a field of a sequence and context aware system for recommendation. More particularly, the present disclosure relates to system(s) and method(s) for context and sequence aware recommendation of trainings to incorporate both context as well as sequential ordering of information of user interest.

BACKGROUND

The effectiveness of recommendation systems is improving with the incorporation of richer context. The frequentist recommendation methods such as Markov models are not efficient in simultaneous use of context and preference sequences over items due to state space explosion. On the other end, abstractionist models such as Matrix Factorization where each item or user is represented as a set of abstract features are difficult to explain.

For training recommendation, it is important to identify the held expertise level in technical area, which represents a state and possible sequences of trainings that represent transitions in terms of real world entities such as trainings and associated features. Alternatively, the model can estimate expertise as a mixture over a tractable set of latent interests in terms of trainings completed, contextual features such as the training sequences, keywords and user role.

Traditional approaches such as context aware recommendation model and token-based bi-gram model. These methods employ the memory based collaborative filtering method and face major issues such as data scarcity problems, which include cold-start and scalability problems. The collaborative filtering methods also have portfolio' problem in which they identify a single narrow interest of users. Further the diversification in recommendations increases its selectiveness which is observed in several prior art documents.

Thus, it is clear that that an efficient recommendation system is a challenge in the existing technology. Further none of the existing prior art literature has implemented using recommendation techniques considering both explicit context and sequence information in a single topic based probabilistic model.

SUMMARY

Before the present methods, systems, and hardware enablement are described, it is to be understood that this disclosure is not limited to the particular systems, and methodologies described, as there can be multiple possible embodiments of the present disclosure, which are not expressly illustrated in the present disclosure. It is also to be understood that the terminology used in the description is for describing the particular versions or embodiments only, and is not intended to limit the scope of the present invention, which will be limited only by the appended claims.

The present disclosure provides a method and system for recommending at least one context and sequence aware training to at least one user in an enterprise. In an aspect of the disclosed subject matter, the system may provide recommendation of trainings to incorporate both context as well as sequential ordering of items or topics of user interest. The context comprises of information from user role in the enterprise and description of previously preferred one or more items of the plurality of historical training data.

In one embodiment, a system for recommending at least one context and sequence aware training to at least one user of an enterprise. The system comprising a processor, a memory coupled to the processor, wherein the processor is capable of executing a plurality of modules stored in the memory. The plurality of modules of the system including an accessing module, an identification module, an analyzing module, a context and sequence aware recommendation model, and a recommendation module as shown in FIG. 2. The accessing module is configured to access the plurality of historical training data, wherein the historical training data is of the users' interest comprising a plurality of items and one or more contextual keywords. The identification module is configured to identify one or more contextual keywords and one or more item bigrams from the accessed plurality of historical training data, wherein the one or more item bigrams are in a predefined sequence of two items associated with the plurality of items. Further, the analyzing module of the system is configured for identifying one or more topic memberships of each employee and one or more topic memberships for each item bigram and each contextual keyword of the historical training data. The topic membership is a probability distribution of one or more employees over the plurality of historical training data. The context and sequence aware recommendation model is generated in the form of the topic membership from the accessed plurality of historical training data by applying a collapsed Gibbs sampling technique over the plurality of items, one or more item bigrams and one or more context keywords. Finally, the system comprising a recommendation module which is configured to apply the generated context and sequence aware recommendation model along with the one or more topic memberships of the user to recommend at least one subsequent training data based on at least one of the context keyword associated from the plurality of items and one or more item bigrams derived with the plurality of items of the plurality of historical training data.

In another embodiment, a method for recommending at least one context and sequence aware training to at least one user of an enterprise. Initially, a plurality of historical training data is accessed by an accessing module, wherein the historical training data is of the users' interest comprising a plurality of items and one or more contextual keywords. At the next step, an identification module is configured to identify one or more contextual keywords and one or more item bigrams from the accessed plurality of historical training data, wherein the one or more item bigrams are in a predefined sequence of two items associated with the plurality of items. Further, one or more topic memberships of each employee and one or more topic memberships for each item bigram and each contextual keyword of the historical training data are identified by an analyzing module, wherein the topic membership is a probability distribution of one or more employees over the plurality of historical training data. The context and sequence aware recommendation model is generated in the form of the topic membership from the accessed plurality of historical training data by applying a collapsed Gibbs sampling technique over the plurality of items, one or more item bigrams and one or more context keywords. Finally, at the last step a recommendation module is configured to apply the generated context and sequence aware recommendation model along with the one or more topic memberships of the user to recommend at least one subsequent training data based on at least one of the context keyword associated from the plurality of items and one or more item bigrams derived with the plurality of items of the plurality of historical training data.

It also models possible dependency among every two consecutive items as item bigram or one or more topics as a subsequence in time. As in LDA, a document in training recommendation scenario is a sequence or trace of trainings taken by an employee, each training represents a word or a token as in a document. The keywords from the employee role such as technologies used in project or title of the training form the feature set are part of the context. In the proposed invention use two vocabularies one consisting of training identities and other consisting of the features or keywords representing previous trainings and user role are used. Additionally in the system herein vocabulary over all possible bigram-like sub-sequences are used.

BRIEF DESCRIPTION OF THE DRAWINGS

The foregoing summary, as well as the following detailed description of preferred embodiments, are better understood when read in conjunction with the appended drawings. For illustrating the invention, there is shown in the drawings exemplary constructions of the invention; however, the invention is not limited to the specific methods and system disclosed. In the drawings.

DETAILED DESCRIPTION

Figure 1:
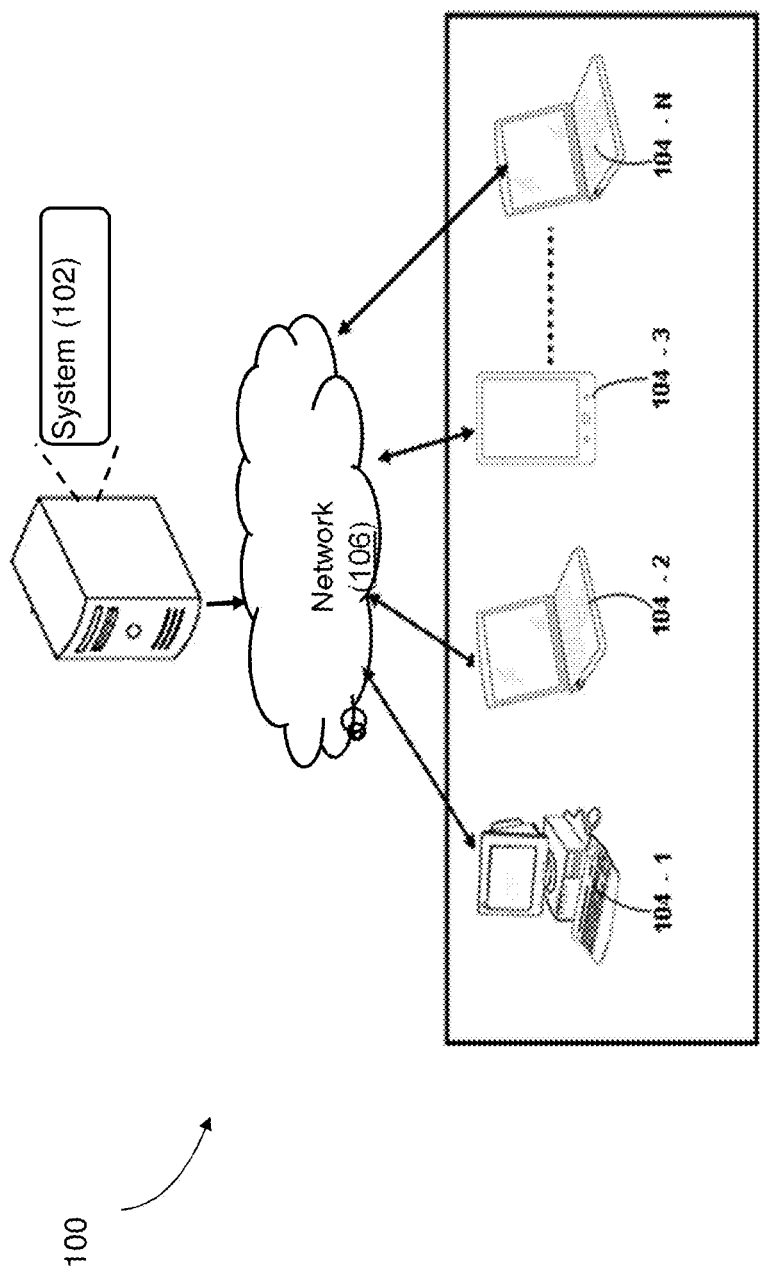
FIG. 1 illustrates a network implementation of a system 102 according to an embodiment of the subject disclosed herein.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present disclosure provides a computer implemented method and system for recommending at least one context and sequence aware training to at least one user of an enterprise. It is to be noted that the user herein includes a new employee to the enterprise or one or more existing employees of the enterprise.

Referring FIG. 1, a network implementation 100 of a system 102 for recommending at least one context and sequence aware training to at least one user of an enterprise is disclosed. Although the present subject matter is explained considering that the server 104 is implemented as a computing system, it may be understood that the server 104 may also be implemented as a variety of computing systems, such as a laptop computer, a desktop computer, a notebook, a workstation, a mainframe computer, a server, a network server, a tablet, a mobile phone, and the like. In one implementation, the server 104 may be implemented in a cloud-based environment. According to an embodiment, the system 102 may be implemented with the vehicle 110. Further, the server 104 may track the activities of the system 102, and the system 102 is communicatively coupled to the server 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another.

Further, the network 106 may include a variety of network devices, including routers, bridges, servers, computing devices, storage devices, and the like.

Figure 2:
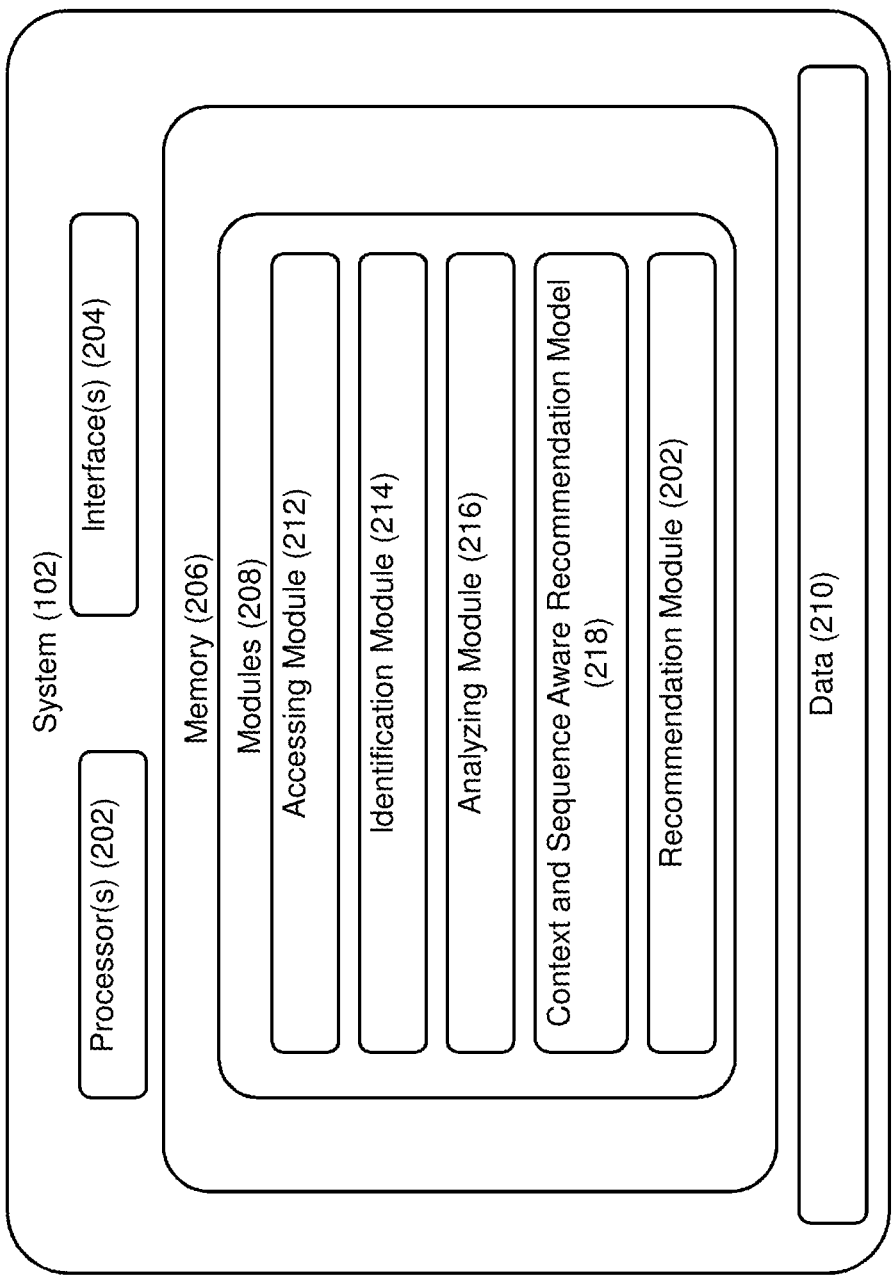
FIG. 2 illustrates the system 102 for recommending at least one context and sequence aware training to at least one user of an enterprise in accordance with an embodiment of the subject matter disclosed herein.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. The modules 208 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may include data generated as a result of the execution of one or more modules. Further, the system comprising an accessing module 212, an extraction module 214, an analyzing module 216, a learning module 218 and a recommendation module 220.

The accessing module 212 of the system 100 is configured to access a plurality of historical training data. The plurality of historical training data includes one or more historical training data completed by at least one employee of the enterprise and one or more certification courses needed to an employee for a particular role in the enterprise. It is to be noted that the user and employee herein can be used interchangeable. The user may be a new employee to the enterprise or other employees. Prior training data of the user includes every training completed by the user of their interest.

The identification module 214 is configured to extract one or more contextual keywords, one or more item bigrams from the accessed plurality of historical training data. The one or more item bigrams in a predefined sequence of two items are identified from the plurality of item. The one or more contextual keywords consists of information from user role and description of previously preferred items. It also models possible dependency among every two consecutive items or topics as a sub-sequence in time. As in LDA, a document in training recommendation scenario is a sequence or trace of trainings taken by an employee "d", each training "r" represents a word or a token as in a document. The keywords from the employee role such as technologies used in project or title of the training form the feature set are part of the context, "c".

In the preferred embodiment, the analyzing module 216 is configured to identify one or more topic memberships for each item and each contextual keyword. Further, for each employee, a probability distribution has the memberships to different topics. Similarly, a distribution is learnt for each item bigram and each context keyword. The topic membership is a probability distribution of one or more employees over the plurality of historical training data.

In one embodiment, the system is configured to generate a context and sequence aware recommendation model in the form of the one or more topic membership by applying a collapsed Gibbs sampling technique over the plurality of items, one or more item bigrams and one or more context keywords of the plurality of historical training data.

In one embodiment, in context and sequence aware recommendation model, vocabulary over all possible bigram-like subsequences of trainings (FIG. 3) or topics (FIG. 4) are used. The context and sequence aware recommendation model modelling and recommendation framework optimizes the recommendations given the last item of the sequence of preferred items or topics within a context. Given a preferred item sequence "d", context "c" and last preferred item "r", the proposed model computes a score for every possible next item "s" as p(c; d; r; s) and ranks them based on this score.

Figure 3:
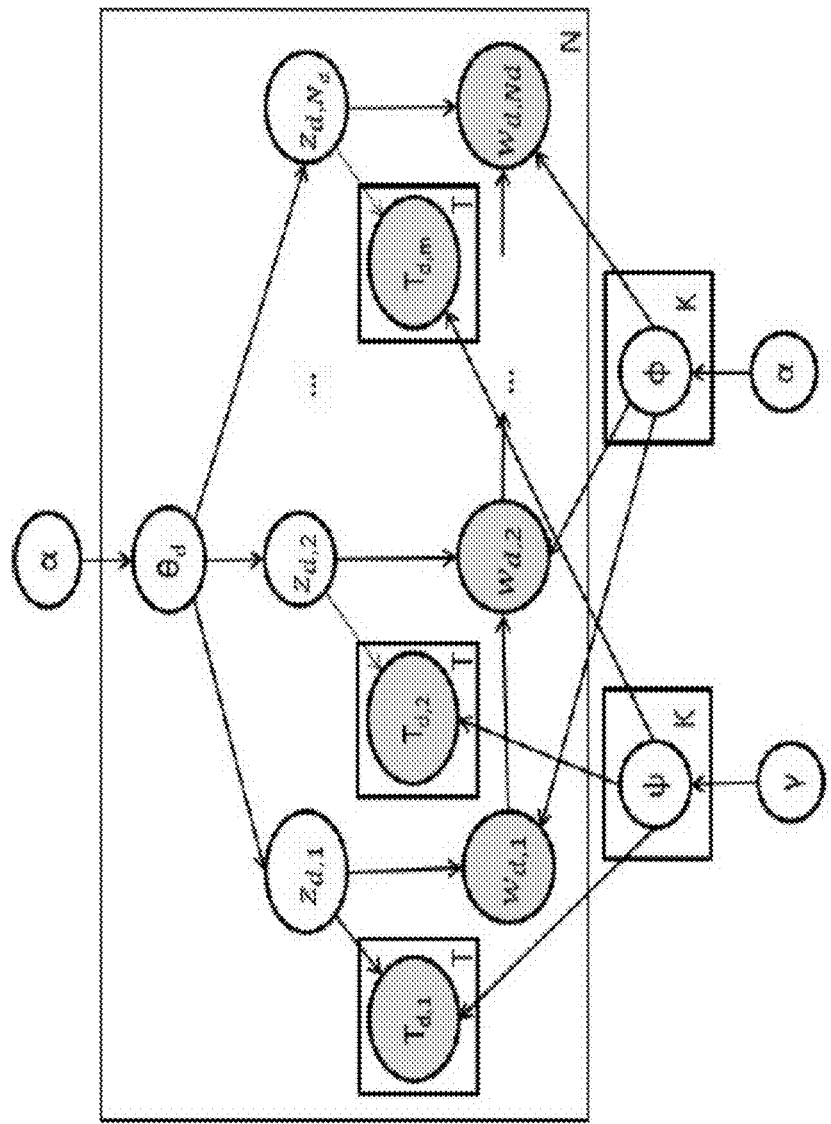
FIG. 3 illustrates a context and sequence aware recommendation system with item sequence in accordance with an embodiment of the subject matter disclosed herein.
Figure 4:
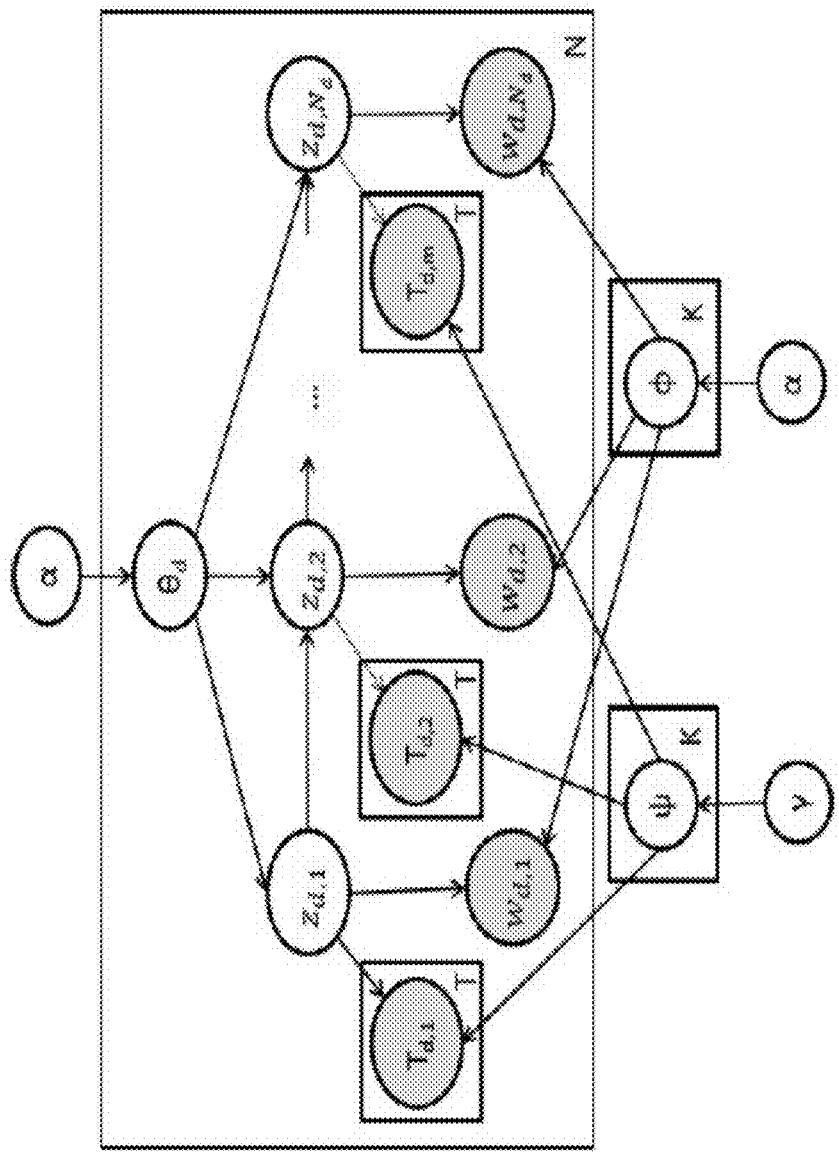
FIG. 4 illustrates a context and sequence aware recommendation along with topic sequence in accordance with an embodiment of the subject matter disclosed herein.

Further, the context and sequence aware recommendation model builds on the sequential topic model and adds the context as shown in FIG. 3, wherein topic model is implemented such that sequence of items preferred by the user are generated using sampled topic from the user-specific distribution of topics and the previous item of the sequence. The $\Phi$ in this case for each of the K topics has a matrix of size $[(V+1) \times V]$ per previous item which represents probability for each next possible item from the vocabulary V.

The following Table 1 illustrates the certain notation that is made use of in describing the disclosure as disclosed herein.

Table 1

| Symbol | Description |
| --- | --- |
| M | # Users or their traces of preferred items |
| N | # Items |
| K | # Topics |
| V | Vocabulary of items |
| T | Vocabulary of features of items |
| Z | Collection of topic sequences, $Z = [Z_1, \ldots, Z_M]$ |
| $N_d$ | # Items in trace for user d |
| $Z_d$ | Topic assignments of items in the trace of user d, $Z_d = \{z_{d,1}, z_{d,2}, \ldots, z_{d,N_d-1}, z_{d,N_d}\}$ |
| W | Collection of sequences of items, $W = \{W_1, \ldots, W_M\}$ |
| $W_d$ | Sequence of items for user d, $W_d = \{w_{d,1}, w_{d,2}, \ldots, w_{d,N_d-1}, w_{d,N_d}\}$ |
| $w_{d,j}$ | $j^{th}$ item from $d^{th}$ sequence |
| $z_{d,j}$ | $j^{th}$ topic from $d^{th}$ sequence, $W_d$ |
| $T_{d,i}$ | Set of features for item i of user d |
| $n_{d,s}^k$ | Number of times item s has been associated with topic k for user d |
| $n_{d,()}^k$ | Number of times topic k has been associated with user d |
| $n_{d,()}$ | Vector $n_{d,()} = \{n_{d,()}^1, n_{d,()}^2, \ldots, n_{d,()}^K\}$ |
| $n_{d,()}^{p,k}$ | Number of times current topic k has been associated with user d when the previous topic was p |
| $n_{d,()}^p$ | Vector $n_{d,()}^{p,k} = \{n_{d,()}^{p,1}, n_{d,()}^{p,2}, \ldots, n_{d,()}^{p,K}\}$ |
| $n_{(),s}^k$ | Number of times item s has been associated with topic k in whole data |
| $n_{()}^k$ | Vector $n_{()}^k = \{n_{(),1}^k, n_{(),2}^k, \ldots, n_{(),N}^k\}$ |
| $n_{(),r,s}^k$ | Number of times topic k has been associated with the token pair r, s in the whole data |
| $\alpha$ | Hyper parameter(s) for user specific Dirichlet distribution over topics |
| $\beta$ | Hyper parameter(s) for user specific Dirichlet distribution over items |
| $\gamma$ | Hyper parameter(s) for topic specific Dirichlet distribution over features |
| $\theta_d$ | Mixing proportion of topics for user d |
| $\theta_{d,k}$ | Mixing proportion of the topic k for user d |
| $\Theta$ | Matrix of parameters $\theta_d$ |
| $\Phi$ | Item distribution for topic k, $\phi_k = \{\phi_{k,s}\}$; For item bigram it becomes $\phi_k = \{\phi_{k,r,s}\}$ |
| $\phi_{k,r,s}$ | Probability of observing item r followed by item s in topic k |
| $\phi_{k,r}$ | Mixing co-efficient of the topic k for the item r which includes all possible sub-sequences of form r, s |
| $\Psi$ | Matrix of feature distribution for k topics |
| $\psi_{k,i}$ | Mixing co-efficient of the topic k for the feature i |

In the preferred embodiment, the recommendation module 220 is configured to apply the generated context and sequence aware recommendation model along with topic membership of the user to recommend at least one subsequent training data based on at least one of contextual keyword, and item bigrams of the historical training data.

In one illustration, where one more item features of the historical training data form context and are depicted as a plate with $T_n$ as the feature count. The topic specific probability distribution over item features is represented as $\Psi$, additionally, the sequential dependency information amongst items for the selected topic is represented as $\Phi$. This represents inherent relationships among items within the subject or domain and/or are of user interest. For training recommendation, the context is represented by keywords from the title of past trainings of an employee as well as used technologies.

For the proposed graphical model of context and sequence aware recommendation as shown in FIG. 3, the joint distribution of W, T, Z, $\Phi$, $\Psi$ is expressed as follows:

$$P(W, T, Z, \Theta, \Phi, \Psi \mid \alpha, \beta, \gamma) = \qquad (1)$$
$$P(W \mid Z, \Phi) P(T \mid Z, \Psi) P(\Phi \mid \beta) P(Z \mid \Theta) P(\Theta \mid \alpha) P(\Psi \mid \gamma)$$

where $$P(W \mid Z, \Phi) = \prod_{u=1}^{M} P(W_u \mid Z_u, \Phi);$$

$$P(W_u \mid Z_u, \Phi) = \prod_{j=1}^{N_u} P(w_{u,j} \mid w_{u,j-1}, z_{u,j}, \Phi)$$

$$P(T \mid Z, \Psi) = \prod_{u=1}^{M} P(T_u \mid Z_u, \Psi);$$

$$P(T_u \mid Z_u, \Psi) = \prod_{j=1}^{N_u} \prod_{l=1}^{|T_{u,j}|} P(t_l \mid z_{u,j}, \Psi);$$

$$P(Z \mid \Theta) = \prod_{u=1}^{M} P(Z_u \mid \theta_u)$$

$$= \prod_{u=1}^{M} \prod_{j=1}^{N_u} P(Z_{u,j} \mid \theta_u);$$

$$P(\Phi \mid \beta) = \prod_{i=1}^{K} P(\phi_i \mid \beta);$$

$$P(\Psi \mid \gamma) = \prod_{i=1}^{K} P(\psi_i \mid \gamma);$$

$$P(\Theta \mid \alpha) = \prod_{u=1}^{M} P(\theta_u \mid \alpha)$$

The generative process is presented as mentioned above. Following are the Gibbs sampling equations:

$$P(z_{d,j} = k \mid Z_{-(d,j)}, s) \propto \qquad (2)$$

-continued $$(n_{d,(\cdot)}^k + \alpha_k - 1) * \frac{(n_{(\cdot),r,s}^k + \beta_{k,r,s} - 1)}{\left(\sum_{s'=1}^{N} n_{(\cdot),r,s'}^k + \beta_{k,r,s'} - 1\right)} * \prod_{i=1}^{|T_s|} \frac{(n_{(\cdot),t}^k + \gamma_{k,t} - 1)}{\left(\sum_{k'=1}^{K} n_{(\cdot),t}^{k'} + \gamma_{k'} - 1\right)}$$

Where $r = w_{d,j-1}$, $s = w_{d,j}$ and $z_{-(d,j)}$ implies that the available $j^{th}$ topic from $d^{th}$ sequence, $W_d$ is ignored.

$$\theta_{d,k} = \frac{n_{d,(\cdot)}^k + \alpha_k}{\sum_{k'=1}^{K} (n_{d,(\cdot)}^{k'} + \alpha_{k'})} \quad (3)$$

$$\phi_{k,r,s} = \frac{n_{(\cdot),r,s}^k + \beta_{k,r,s}}{\sum_{s'=1}^{N} (n_{(\cdot),r,s'}^k + \beta_{k,r,s'})} \quad (4)$$

$$\psi_{k,t} = \frac{n_{(\cdot),t}^k + \gamma_{k,t}}{\sum_{k'=1}^{K} (n_{(\cdot),t}^{k'} + \gamma_{k'})} \quad (5)$$

Further, the system is configured for ranking inferred one or more training data. In an aspect, for a user d with a trace $W_d$ consisting of $N_d$ preferred items, the rank of an item "s" as recommendation for $N_d+1$ item selection is as follows. The following technique extends ranking includes the feature contributions from items based on the sampled topic as well as the dependency amongst items. In the equation a term $P(s|z_{d,Nd+1}=k; r)$ factors in the dependency of previous item r and the term related to $t_i$ captures contribution of the features to the computed rank.

$$\text{rank}(s, d) = \sum_{k=1}^{K} P(s | z_{d,N_d+1} = k, r) * \prod_{i=1}^{|T_s|} (t_i | z_{d,N_d+1} = k) P(z_{d,N_d+1} = k | \theta_d) \quad (6)$$

$$\text{rank}(s, d) = \sum_{k=1}^{K} \left( \phi_{k,r,s} \theta_{d,k} \prod_{i=1}^{|T_s|} \psi_{k,i} \right) \quad (7)$$

Figure 5:
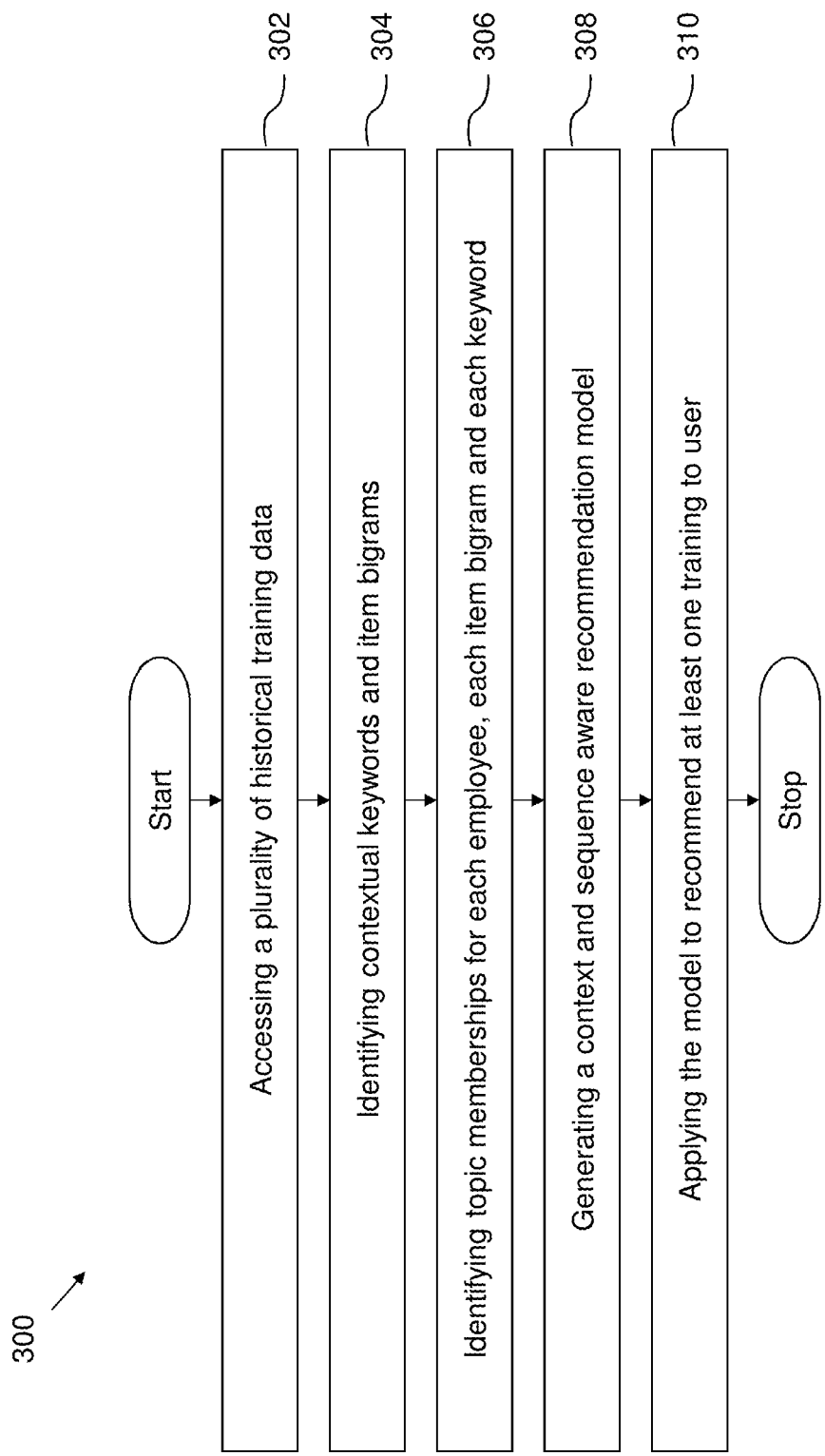
FIG. 5 illustrates a flowchart 200 for recommending at least one context and sequence aware training to at least one user of an enterprise in accordance with an embodiment of the subject matter disclosed herein.

In another embodiment, a method 300 for recommending at least one context and sequence aware training to at least one user of an enterprise as shown in FIG. 5.

Initially, at the step 302, an accessing module accesses a plurality of historical training data. The historical training data includes a plurality of items and one or more contextual keywords. The plurality of historical training data includes one or more historical training data completed by at least one employee of the enterprise and one or more certification courses needed to an employee for a particular role in the enterprise. It is to be noted that the user and employee herein can be used interchangeable. The user may be a new employee to the enterprise or other employees. The plurality of historical training data of the user includes every training completed by the user of their interest.

At the step 304, where the process identifies at an identification model of the system one or more contextual keywords, one or more item bigrams from the accessed plurality of historical training data. The one or more item bigrams in a predefined sequence of two items are identified from the plurality of items.

At the step 306, one or more of topic memberships are identified by an analyzing module for each item, each contextual keyword, and for each employee of the enterprise. Each employee of the enterprise has a probability distribution that is memberships to one or more topics.

At the step 308, a context and sequence aware model is generated in the form of the topic membership from the accessed plurality of historical training data by applying a collapsed Gibbs sampling technique over the plurality of items, one or more item bigrams and one or more context keywords.

Finally, at the step 310, the process applies the generated context and sequence aware recommendation model along with one or more of topic memberships of the user, each item, each item bigram and each contextual keyword to recommend at least one subsequent training data based on at least one of the context keyword derived from the plurality of items, one or more item bigrams associated with the plurality of items of the historical training data.

In order to perform experiment illustrating the working of the proposed method and system. The present system is also compared with the accuracy of the recommendation of LDA, pure sequence based model and context and sequence aware recommendation. The models are evaluated on the enterprise data of technical and domain trainings as well as on the last.fm music data for recommending next artist using the tags provided by the listeners.

The technical trainings pertain to technology platforms such as J2EE and .Net, technologies such as JSP and JSF, frameworks such as Struts and Hibernate, packaged software such as SAP, to name a few. The domain trainings pertain to the business domains such as Banking, Insurance, Manufacturing, Retail, and so on. The trainings data is for five year duration. The last.fm data has listening history of users over seven year duration. The dataset details are in Table 2.

|  | Technical | Domain | Last · Fm |
| --- | --- | --- | --- |
| Training data sparsity | 99.75 | 99.65 | 98.61 |
| Test data sparsity | 99.75 | 99.64 | 98.84 |
| # users in training dataset | 76683 | 3000 | 493 |
| # users in test dataset | 19171 | 786 | 139 |
| # distinct items | 3134 | 1419 | 7782 |
| # distinct keywords from context | 1895 | 1750 | 3861 |
| # instances in training dataset | 593318 | 14709 | 53053 |
| # instances in test dataset | 149503 | 3932 | 12469 |
| Maximum number of items preferred by a user in training dataset | 579 | 42 | 1687 |
| Maximum number of items preferred by a user in test dataset | 170 | 51 | 1018 |

The baseline models namely LDA, context and sequence aware recommendation, and model based on sequence data of preferred items are used to compare with the instant context and sequence aware recommendation model. 5-fold cross validation with 80 percent randomly selected employee traces is used for training and remaining 20 percent for testing prediction of the last training. To identify the last training(s) for an employee in test set, firstly the topic distribution for the employee is learned using all except the last training. For each employee the recommended trainings are the top L trainings with higher scores that are computed using Eqn. 7. The results for the cross validation are measured using the metric of hit ratio.

The hit ratio is a user-oriented precision measure valuing the user preference amongst recommended items while ignoring the order of recommended items. If the actual last training $t_l$ is present in the ordered set of top L ranked recommended trainings $R_L$ for an employee u, then it is considered as a hit. The hit ratio is the ratio of hits to the total count of attempted training predictions for the test set of employees and L is the rank for the hit ratio.

For an algorithm run, hit ratio for rank L, is given as: $h(L) = |u \in testset: t_l \in R_L|/|testset|$. The hit ratio measure for a value of L, which is in the range from 1 to 20, is an average of 20 runs.

It may be noted that for the purpose of the instant experiments the data sets are partitioned for training and testing by splitting users as 80%-20% and not based on the number of trainings done by each user. This is done to avoid extreme sparsity in case of the advanced trainings, which are done by a smaller number of users.

The uninformed Dirichlet priors for all model distributions are vectors with uniform value 0.01 for each hyper-parameter namely $\alpha=0.01$, $\beta=0.01$, and $\gamma=0.01$. The number of topics used in experiments are in the range from 10 to 50.

In Gibb's Sampling, we perform 10,000 iterations along with a sample lag of 30 and discard the first 1000 iterations as burn-in.

Figure 6:
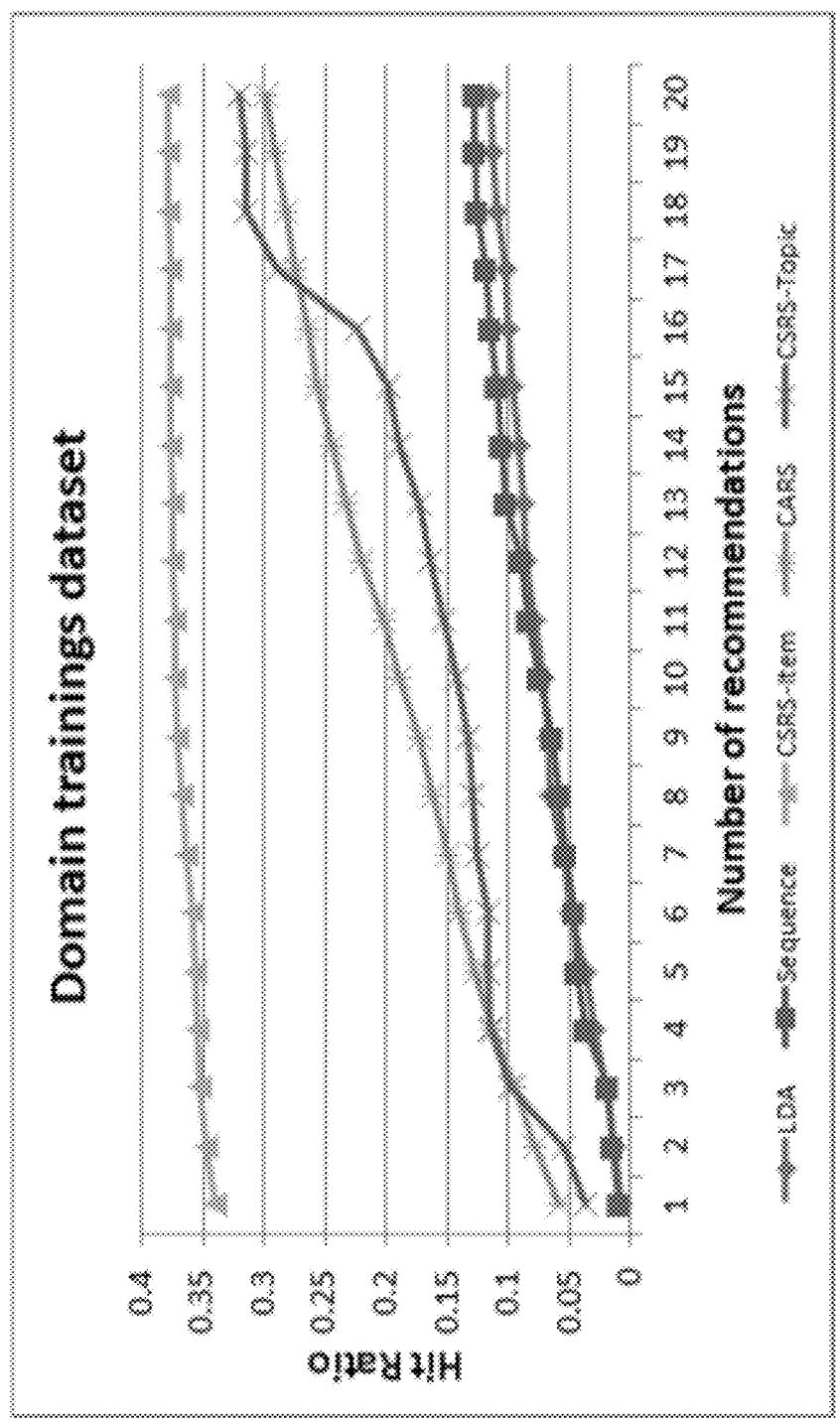
FIG. 6 illustrates a performance analysis on one or more domain trainings for fifteen topics in in accordance with an embodiment of the subject matter disclosed herein.

Referring FIG. 6, wherein for the domain trainings and last.fm dataset the context and sequence aware recommendation model scores in hit ratio over the other previously used methods and in case of technical trainings, the context and sequence aware recommendation and sequence based models are comparable and they both perform better than LDA and context aware recommendation model.

Figure 7:
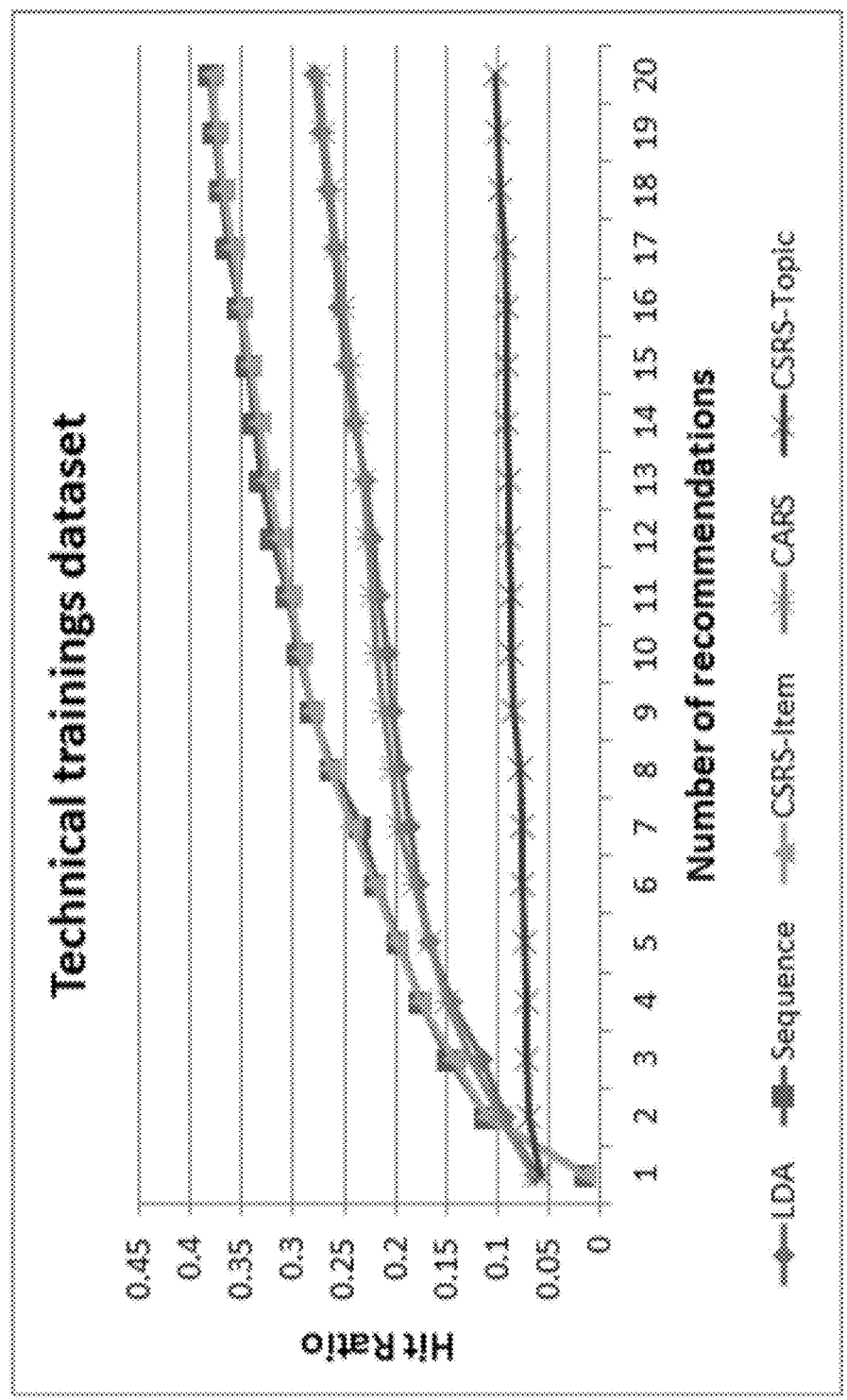
FIG. 7 illustrates a performance analysis on technical trainings for fifteen topics in accordance with an embodiment of the subject matter disclosed herein.

Referring FIG. 7, wherein it shows that the hit ratio for domain training recommendation starts from, a very high, 0.33 and saturates to 0.38 as the recommendation list grows from 1 to 20 in size. In comparison to context and sequence aware recommendation model, context aware recommendation model and LDA show a continuous improvement in hit ratio although not reaching up to the level of context and sequence aware recommendation.

Figure 8:
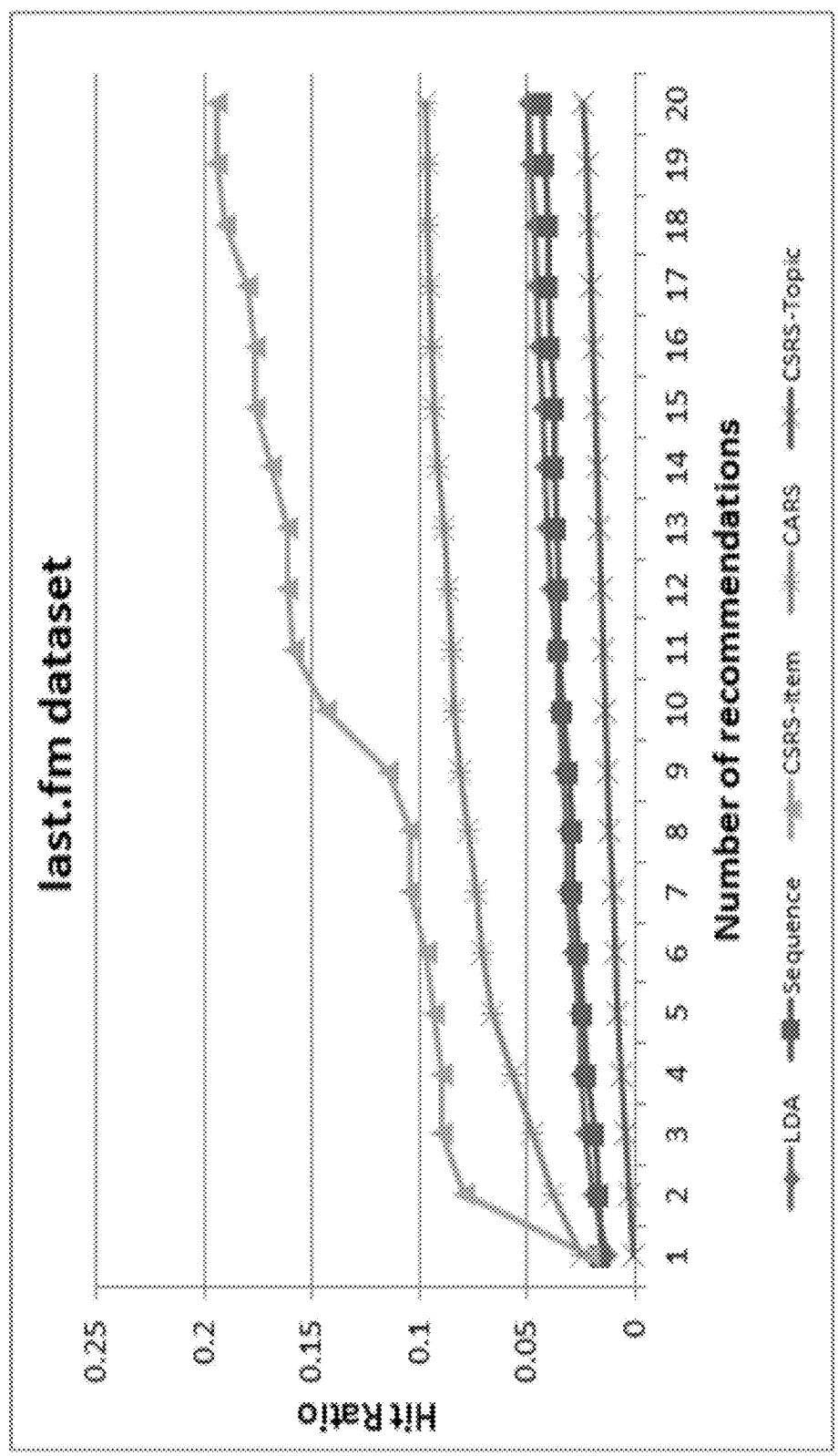
FIG. 8 illustrates a performance analysis on last.fm dataset for fifteen topics in accordance with an embodiment of the subject matter disclosed herein.

Referring FIG. 8, wherein for the last.fm artist recommendation, the hit ratio for top 10 recommendation has approximately 80 percent improvement over context aware recommendation model which comes closest in hit ratio. It is seen that context aware recommendation model (FIG. 4) performs poorly for technical trainings and last.fm datasets. For domain training dataset it displays a step function approaching accuracy achieved by context aware recommendation model.

In case of the last.fm dataset as shown in FIG. 8, the context and sequence aware recommendation model is best and its hit ratio is gradually increasing with the rank. Artists can explain this, as the tags associated with songs by artists are available in large numbers that have larger but diffused influence over topic definitions as compared to the bigram sub-sequences of songs.

This richer, multidimensional contextual feature based topic definition helps context and sequence aware recommendation model perform better than the LDA and sequence based models that use only item or item bigram co-occurrence. The co-occurrence of bigram sequences and tags define better topics explaining higher context and sequence aware recommendation model hit-ratios over context aware recommendation model.

For the technical training dataset (FIG. 7), the effect of training order is significant as both sequence-based model and context and sequence aware recommendation model show comparable hit ratios, with no contribution of contextual keywords. Their hit ratios are better than LDA and context aware recommendation model by 40 percent. The hit ratios achieved by LDA and context aware recommendation model are comparable and show no effect of contextual keywords.

It may be understood by a person skilled in the art that although the subject matter disclosed herein is illustrated with reference to certain embodiments, this is in no way to limit the scope of the subject disclosed herein and the method and system disclosed may be implemented in embodiments other than those disclosed in this disclosure.

What is claimed is:

1. A system for recommending at least one context and sequence aware training to at least one user of an enterprise, wherein the system comprising:
    a processor;
    a memory coupled to the processor, wherein the processor is capable of executing a plurality of modules stored in the memory;
    an accessing module configured to access a plurality of historical training data, wherein the historical training data is of the user's interest comprising a plurality of items and one or more contextual keywords pertaining to trainings of interest specific to the user;
    an identification module configured to identify one or more contextual keywords and one or more item bigrams from the plurality of items and the one or more contextual keywords pertaining to the trainings of interest specific to the user, wherein the one or more item bigrams are in a predefined sequence of two items associated with the plurality of items;
    an analyzing module configured to identify one or more topic memberships of each user and one or more topic memberships for each item and each contextual keyword of the historical training data, wherein the topic membership is a probability distribution of one or more users over the plurality of historical training data;
    a context and sequence aware recommendation model is generated in the form of the topic membership from the accessed plurality of historical training data by applying a collapsed Gibbs sampling technique over the plurality of items, one or more item bigrams and one or more context keywords, wherein the context and sequence aware recommendation model builds on a sequential topic model and adds the context to the sequential topic model, wherein the sequential topic model is implemented such that a sequence of preferred items by the user are generated using sampled topic from the user-specific distribution of topics and the previous item of the sequence; and
    a recommendation module configured to apply the generated context and sequence aware recommendation model along with the one or more topic memberships of the user to recommend at least one subsequent training data based on at least one of the context keyword derived from the plurality of items and one or more item bigrams associated with the plurality of items of the plurality of historical training data, wherein the recommendation module optimizes the recommendations, using generated context and sequence aware recommendation model, by computing a score for every possible next item "s" and ranking the possible next item 's' based on the score given by the last item of the sequence of preferred items or topics pertaining to topic memberships within the context, and given the sequence of preferred items or the topics "d", the context "c" and the last preferred item "r".

2. The system of claim 1, wherein the plurality of historical training data includes one or more previous training data completed by at least one employee of the enterprise and one or more certification courses needed to an employee for a particular role in the enterprise.

3. The system of claim 1, wherein the context and sequence aware recommendation model learns one or more topic memberships for each employee as well as for each item bigram and context keyword associated with each historical training data.

4. The system of claim 1, wherein a user includes a new employee to the enterprise or an existing employee of the enterprise.

5. A method for recommending at least one context and sequence aware training to at least one user of an enterprise, wherein the method comprising:
    accessing a plurality of historical training data, wherein the historical training data is of the users' interest comprising a plurality of items and one or more contextual keywords pertaining to trainings of interest specific to the user;
    identifying one or more contextual keywords and one or more item bigrams from the plurality of items and the one or more contextual keywords pertaining to the trainings of interest specific to the user, wherein the one or more item bigrams are in a predefined sequence of two items associated with the plurality of items;
    identifying one or more topic memberships of each user and one or more topic memberships for each item and each contextual keyword of the historical training data, wherein the topic membership is a probability distribution of one or more users over the plurality of historical training data;
    generating a context and sequence aware recommendation model in the form of the topic membership from the accessed plurality of historical training data by applying a collapsed Gibbs sampling technique over the plurality of items, one or more item bigrams and one or more context keywords, wherein the context and sequence aware recommendation model builds on a sequential topic model and adds the context to the sequential topic model, wherein the sequential topic model is implemented such that a sequence of preferred items by the user are generated using sampled topic from the user-specific distribution of topics and the previous item of the sequence; and
    applying the generated context and sequence aware recommendation model along with the one or more topic memberships of the user to recommend at least one subsequent training data based on at least one of the context keyword derived from the plurality of items and one or more item bigrams associated with the plurality of items of the plurality of historical training data, wherein the recommendation module optimizes the recommendations, using generated context and sequence aware recommendation model, by computing a score for every possible next item "s" and ranking the possible next item 's' based on the score given by the last item of the sequence of preferred items or topics pertaining to topic memberships within the context, and given the sequence of preferred items or the topics "d", the context "c" and the last preferred item "r".

6. The method of claim 5, wherein the plurality of historical training data includes one or more previous training data completed by at least one employee of the enterprise and one or more certification courses needed to an employee for a particular role in the enterprise.

7. The method of claim 5, wherein the context and sequence aware recommendation model learns one or more topic memberships for each employee as well as for each item bigram and context keyword associated with each historical training data.

8. The method of claim 5, wherein a user includes a new employee to the enterprise or an existing employee of the enterprise.

9. A non-transitory computer readable medium storing instructions for recommending at least one context and sequence aware training to at least one user of an enterprise, the instructions comprise:
    accessing a plurality of historical training data, wherein the historical training data is of the users' interest comprising a plurality of items and one or more contextual keywords pertaining to trainings of interest specific to the user;
    identifying one or more contextual keywords and one or more item bigrams from the plurality of items and the one or more contextual keywords pertaining to the trainings of interest specific to the user, wherein the one or more item bigrams are in a predefined sequence of two items associated with the plurality of items;
    identifying one or more topic memberships of each user and one or more topic memberships for each item and each contextual keyword of the historical training data, wherein the topic membership is a probability distribution of one or more users over the plurality of historical training data;
    generating a context and sequence aware recommendation model in the form of the topic membership from the accessed plurality of historical training data by applying a collapsed Gibbs sampling technique over the plurality of items, one or more item bigrams and one or more context keywords wherein the context and sequence aware recommendation model builds on a sequential topic model and adds the context to the sequential topic model, wherein the sequential topic model is implemented such that a sequence of preferred items by the user are generated using sampled topic from the user-specific distribution of topics and the previous item of the sequence; and
    applying the generated the generated context and sequence aware recommendation model along with the one or more topic memberships of the user to recommend at least one subsequent training data based on at least one of the context keyword derived from the plurality of items and one or more item bigrams associated with the plurality of items of the plurality of historical training data, wherein the recommendation module optimizes the recommendations, using generated context and sequence aware recommendation model, by computing a score for every possible next item "s" and ranking the possible next item 's' based on the score given by the last item of the sequence of preferred items or topics pertaining to topic memberships within the context, and given the sequence of preferred items or the topics "d", the context "c" and the last preferred item "r".

* * * * *